No. 833,424. PATENTED OCT. 16, 1906.
F. H. SMITH.
CASH RECORDER.
APPLICATION FILED DEC. 28, 1904.
4 SHEETS—SHEET 1.
Fig. 1.
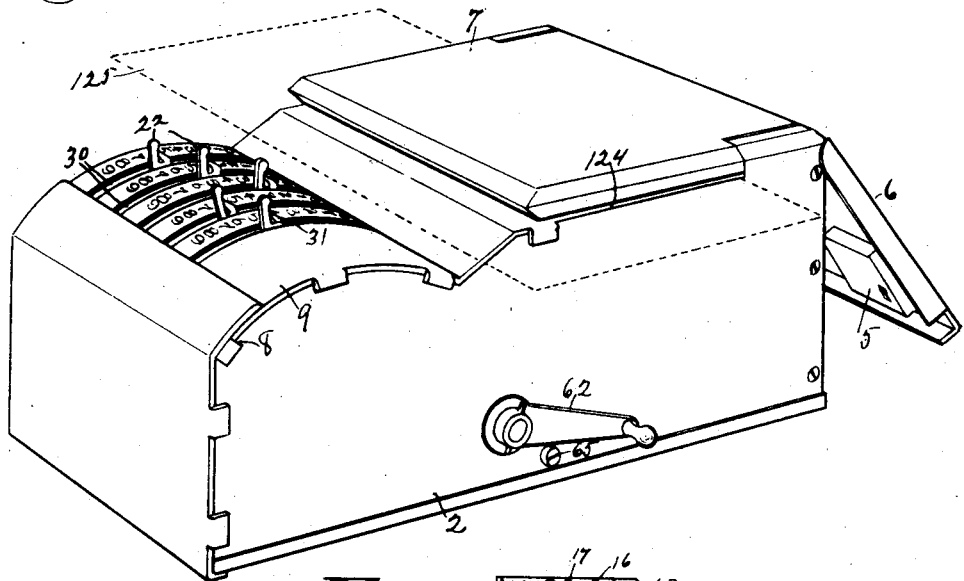
Fig. 2.
Fig. 13.
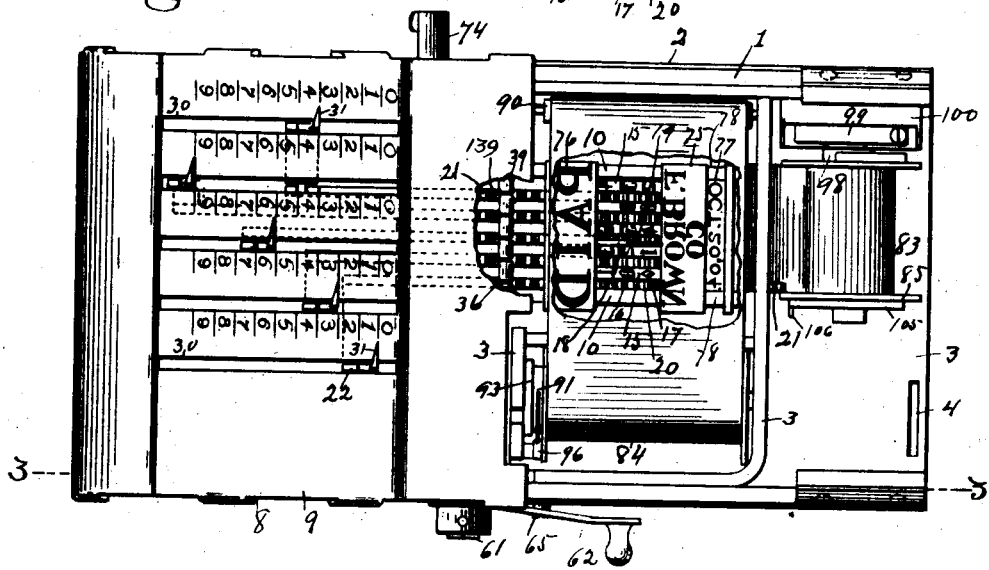
Witnesses.
Arthur L. Shei,
W. S. Boyd.
Inventor
Frederick H. Smith
by E. B. Osborn
his atty.

No. 833,424. PATENTED OCT. 16, 1906.
F. H. SMITH.
CASH RECORDER.
APPLICATION FILED DEC. 28, 1904.

4 SHEETS—SHEET 2.

Witnesses
Arthur L. See
W. S. Boyd

Inventor
Frederick H. Smith
by Osborn
his atty.

No. 833,424. PATENTED OCT. 16, 1906.
F. H. SMITH.
CASH RECORDER.
APPLICATION FILED DEC. 28, 1904.
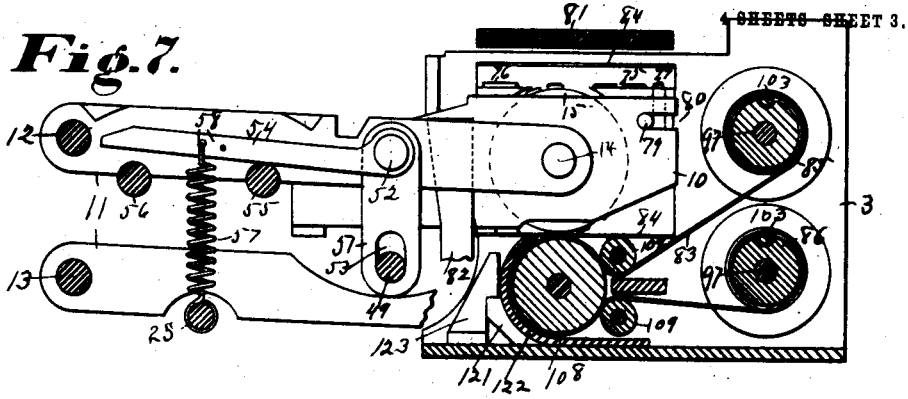
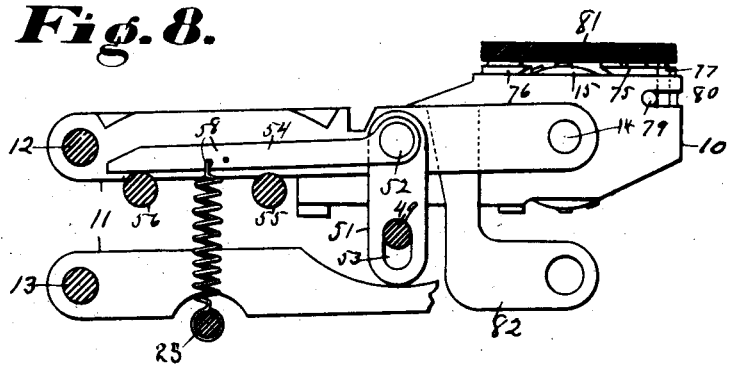
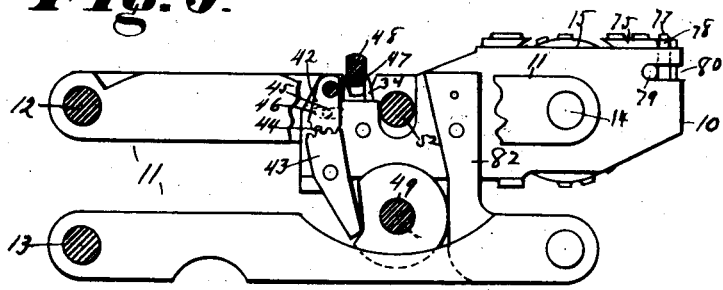
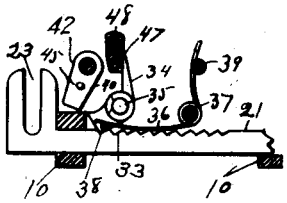
Witnesses.
Arthur L. Slee
W. S. Boyd.
Inventor
Frederick H. Smith,
by R. E. Osborn
his atty.

No. 833,424. PATENTED OCT. 16, 1906.
F. H. SMITH.
CASH RECORDER.
APPLICATION FILED DEC. 28, 1904.

4 SHEETS—SHEET 4.

Witnesses
Arthur T. Lee
W. S. Boyd,

Inventor
Frederick H. Smith
by E. G. Osborn
his atty

UNITED STATES PATENT OFFICE.

FREDERICK H. SMITH, OF SAN FRANCISCO, CALIFORNIA, ASSIGNOR TO RECEIPTOTYPE CO., OF SAN FRANCISCO, CALIFORNIA, A CORPORATION.

CASH-RECORDER.

No. 833,424.     Specification of Letters Patent.     Patented Oct. 16, 1906.

Application filed December 28, 1904. Serial No. 238,601.

*To all whom it may concern:*

Be it known that I, FREDERICK H. SMITH, a citizen of the United States, residing in the city and county of San Francisco and State of California, have invented new and useful Improvements in Cash-Recorders, of which the following is a specification.

This invention relates to what may be called a "portable cash-recorder," by means of which it is always possible to determine whether the amount of money taken in by a traveling collector is fully accounted for without resorting to secret or other offensive means of determination.

One object of the invention is to provide a machine which is small and compact, so as to be easily carried, and will afford means for stamping a bill or other form of indebtedness as having been paid and also indicating on the bill the amount of money that actually was paid.

Another object is to record the same amount within the machine in a permanent form, so that it may be removed and kept for future reference, if desired.

Another object is to provide means for recording the date on the bill when the payment is made and changing said means from day to day.

Another object is to provide means for locking the mechanism against movement after it has been set and then releasing it after the record has been completed.

With these and other objects in view my invention consists in the improved construction and novel arrangement of parts of a cash-recorder, as will be hereinafter more fully set forth.

Figures 3, 4, 5, 6:
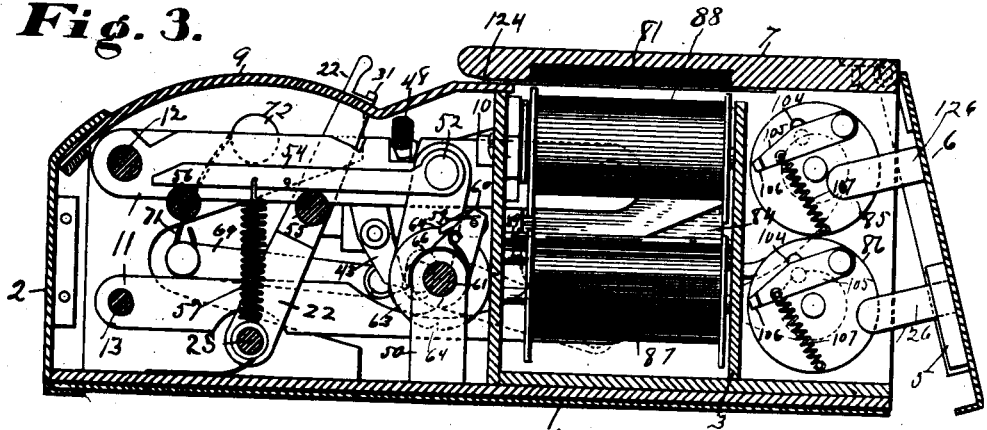
Figure 11:
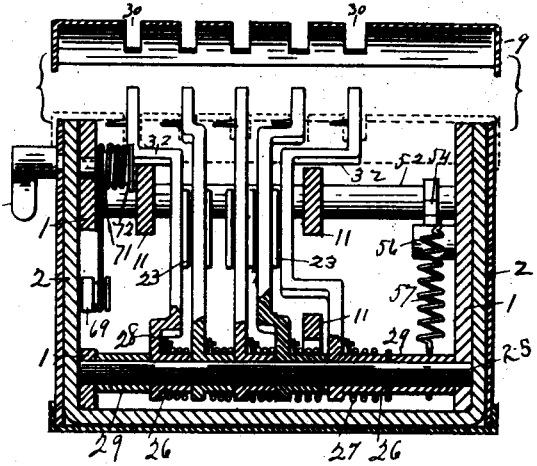
Figure 12:
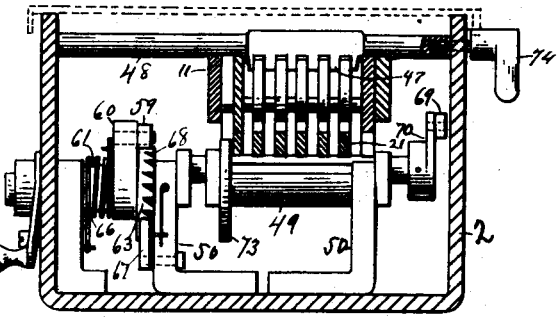

Referring to the accompanying drawings, in which the same reference-numerals indicate corresponding parts in each of the views in which they occur, Figure 1 is a perspective view of a machine embodying my invention, a piece of paper being shown in it in dotted lines. Fig. 2 is a broken top plan view of the machine with a portion of the top removed. Fig. 3 is a longitudinal sectional view on the line 3 3, Fig. 2. Fig. 4 is a longitudinal sectional view, the line of section being taken in different lines laterally and vertically to show some of the parts in their position relatively to other parts. Fig. 5 is a broken side elevation of the paper-feed mechanism. Fig. 6 is a broken sectional view of the ribbon-feeding mechanism with the paper-rolls shown in dotted lines; Fig. 7, a side elevation, partly in section, showing the position of the printing mechanism and some of its accessories when making the first or down stroke. Fig. 8 is a similar view of the printing mechanism when making the second or up stroke. Fig. 9 is a broken side elevation of the printing mechanism, showing the locking and releasing mechanism. Fig. 10 is a detail view of one of the actuating-bars and the means for locking and releasing the same. Fig. 11 is a transverse sectional view through the forward end of the machine, some of the parts being omitted to avoid confusion. Fig. 12 is a similar view through the mid-portion of the machine. Fig. 13 is an edge view of a portion of the printing mechanism.

In manufacturing a machine embodying the invention a double casing is provided, the inner one of which ,1, carries the operative mechanism and the other one, 2, acts as a shield or a guard to prevent access being had to the inner mechanism except by the removal of all or a portion of the outer casing. Removably secured in one end of the inner casing is a frame 3, carrying the paper and inking-ribbons, as will be hereinafter more fully described. The frame and the inner casing are each provided with a slot 4, through which the bolt of the lock 5 on the outer casing projects when the device is closed and prevents access to the interior of the casing until after the lock has been opened. The rear wall 6 of the outer casing is hinged at its upper edge to the top plate 7, so as to be swung outward when it is desired to remove or replace the frame 3. The forward portion of the outer casing is provided with overlapping joints 8, and the rear edge of the front cover 9 is seated below the forward edge of the top plate 7 and is therefore assured against removal until after the top plate has been removed.

A frame 10 is mounted at the rear end of three levers 11, so as to be movable vertically when said levers are rocked upon the pivots 12 and 13, two of the levers being mounted on the upper pivot 12 and one on the lower pivot 13. Mounted in the frame 10, preferably on the shaft 14, are a series of recording-wheels 15. Each of these wheels is provided with a double set of numbers or characters 16 from "0" to "9" and are so arranged that the same characters on each wheel are diametrically opposite to each other. An additional character 17—as, for instance, a diamond—is located adjacent to the "0" to indicate that each wheel has made an imprint, thereby insuring absolute accuracy of the machine by always making an imprint of some kind or other when the machine is operated. Located between two of the wheels is a stationary disk 18, on which is placed a small spur 19 to mark the division between the dollars and cents columns. Secured to one side of each of said wheels is a gear-wheel 20, with which a reciprocating rack-bar 21 is adapted to engage and partially rotate the wheels as the bars are moved back and forth by means of the setting-levers 22.

The rack-bars rest on the bottom of the frame 10, with their rear ends projecting beyond the wheels 15 and slightly above the lower edges thereof, so as not to interfere with the printing mechanism, and their forward ends are each provided with means for engaging with one of the levers 22—as, for instance, an upwardly-extending slotted arm 23, with which a pin 24 on the side of the lever engages and moves the bar back and forth as the lever is swung on its pivot.

The lower ends of the levers 22 are mounted on a rod or lever 25, and each pivot is provided with a hub 26, around which is coiled a spring 27, one end of the spring engaging with a pin 28 on the lever and the other end resting on the bottom of the casing. The levers are prevented from lateral movement on the rod by suitable shoulders, as by means of a sleeve 29 at each end. The upper end of each lever projects through a slot 30 in the front cover 9 and is provided with a pointer 31, which is adapted to move adjacent to a series of characters or numbers which correspond with the characters on the recording-wheels. The pointers 31 are each arranged to stand below the character which it is desired to print, so that when each lever stands at the end of its slot its pointer will be above the zero-mark, and therefore the diamond-shaped character will be printed. Owing to the movement of the levers on their pivots, it is desirable to curve that portion of the cover, so that the pointers will always stand close enough to their respective characters to avoid making errors in setting the machine. To provide sufficient room for forming the characters on the cover, the upper ends of the levers are bent laterally, as shown at 32, and the lower ends are bent in a corresponding manner to give sufficient room for the springs, which are adapted to hold the upper ends of the levers at their rear or zero position. The forward end of each rack-bar 21 is provided with stops or shoulders 33, which are preferably formed by V-shaped notches cut in the top of the bar, as shown in Fig. 10. Fitting in these notches are a series of pawls 34, which are pivotally mounted on a rod 35. Springs 36 are mounted on a rod 37, one end of which engages with a pin 38 on its respective pawl, and the other end engages with a rod 39, said rod being preferably notched or grooved, as at 139, to prevent lateral movement of the ends of the springs.

Pivotally mounted in the forward end of the frame 10 is a locking-plate 40, with its lower edge in position to be swung back and forth above and in front of the forward ends of the pawls 34, the upper surface of each pawl being slightly curved to permit of this movement of the locking-plate. Normally the lower edge of the plate stands in front of the pawls, so that the pawls may move vertically as the rack-bar is actuated or moved under them. The plate is held in this normal position by any well-known means and is moved into its locking position by means of an arm 42, which engages with a lever 43 by means of teeth 44, as shown in Fig. 9. The arm 42 is mounted on the pivotal rod of the plate 40, so as to be movable thereby, and it is also preferably connected to the plate by means of a pin 45, which fits a slot 46 in the forward end of the frame 10.

As above described, it is evident that whenever either one or all of the setting-levers are moved forward the rocking-bars 21 will be moved longitudinally a corresponding distance, thereby rotating the wheels 15 until the desired recording character thereon is brought into printing position. This is indicated by the pointer on the lever standing opposite the same character on the front cover. The lever and pointer are prevented from making the return movement by the engagement with the bar of the pawl 34. When it is desired to return the levers and the printing mechanism to their normal position, the pawls are raised from the racks by means of the cam 47 on a shaft 48, which engages with the free ends of the pawls and throws them rearward or lifts their forward ends out of engagement with the bars, when the springs 27 immediately return the levers, bars, and registering-wheels to their normal position.

The frame 10 is moved vertically by means of a crank-shaft 49, which is mounted in suitable standards 50, projecting upwardly from the bottom of the inner casing 1. Two links 51 (see Figs. 7 and 8) extend from the crank of said shaft to and are pivotally connected with a rod 52, which extends through the frame 10 and has its ends in close engagement with the walls of the inner casing 1 to prevent lateral movement without interfering with the vertical movement. The lower end of each link is provided with a slot 53, through which the crank-shaft extends and which permits of a slight play or loose movement of the crank relative to the links as the shaft is rotated. An arm or lever 54 is secured to one end of the rod 52 and extends forward and engages with two pins 55 and 56, projecting inwardly from the side of the inner casing 1. A spring 57 is connected at one end with the arm between the pins 55 and 56 and at the other end with the shaft 25. As the crank-shaft is rotated to cause the frame 10 to be moved vertically the arm 54 will be rocked on the pins 55 and 56, so as to be raised from one or the other of the pins as the crank engages with the top and bottom, respectively, of the slots 53. For instance, when the frame is drawn downward in making the first imprint the arm will be rocked on the pin 55, but when it is making the upstroke it will be rocked on the pin 56; but in each instance the spring 57 will be stretched or placed under tension, and as soon as the crank-shaft passes the dead-center the spring will return the frame to its normal position with the arm engaging both of the pins. The connection of the upper end of the spring with the arm is adjustable, as by means of perforations 58 in the arm, by means of which the engagement of the spring with the arm can be adjusted or varied to suit the condition of the printing mechanism.

The crank-shaft 49 is rotated by means of the pawl 59, which is mounted at the outer end of an arm 60 on a rock-shaft 61, the outer end of said shaft being provided with a handle 62, as shown in Fig. 12. The pawl 59 is adapted to engage with a ratchet-disk 63 on the end of the crank-shaft 49 and rotate it a half-revolution by means of either one of two notches 64 each time that the rock-shaft 61 is rocked to the limit of its movement. The rock-shaft is preferably returned to its normal position with the handle 62 in engagement with the pin 65 by means of a spring 66, and the disk 63 is prevented from turning backward during this return movement by means of a pawl 67, which engages with teeth 68 in the side or edge of the periphery of the disk. A link 69 may be connected with the crank-shaft by means of a crank 70, so as to complete the revolution of the shaft 49 by means of a spring 71 after the shaft has been rotated its first semirevolution by means of the handle 62, the coiled portion of the spring being mounted upon a stud 72, which projects inward from the side of the casing 1; but owing to the operation of other portions of the mechanism, and especially the paper-feed, I prefer to complete the revolution of the crank-shaft by operating the handle 62 a second time.

Mounted on the crank-shaft 49 in position to engage with the free end of the lever 43 is a cam 73, (see Figs. 4 and 9,) which is adapted to engage with the lever and move it sufficiently to cause the locking-plate 40 to engage with the pawls 34 as soon as the crank-shaft begins to rotate after the printing mechanism has been set by the levers 22. The periphery of the cam is substantially circular, so as to hold the locking-plate in engagement with the pawls, except for a short distance, where it is cut away, so as to permit the inward movement of the lower end of the lever and the outward movement of the locking-plate at the completion of the revolution of the crank-shaft. After the pawls have been released in this manner the pawls may be disengaged from the rack-bars by rotating the cam-shaft 48 by means of a handle 74, which is detachably secured to the end of the shaft which projects beyond the outer casing 2.

If desired, the frame 10 may be provided with two plates 75 and 76, arranged on opposite sides of the wheels 15, one of which contains the name of the firm using the machine and also the date of the collection, and the other one is provided with the letters "Paid," as shown in Fig. 2. The date characters 77 of the plate 75 are removable, as by fitting in a slot 78 in the plate, and the plate may be removably held in position by means of pins 79, which fit in slots 80 in the rear end of the frame 10. As the plates in connection with the wheels form a substantially flat surface of considerable area, which must be forced against a printing-surface, as an elastic bed 81 in the top plate 7, and as the frame is mounted pivotally at the free ends of the levers 11, it is necessary to provide means for causing it to remain parallel with the bed at all times. This is accomplished by means of an L-shaped link 82, (see Figs. 8 and 9,) which is rigidly secured at one end to the frame substantially midway of its length and pivotally secured at its other end to the lower lever 11. As the frame is pivotally secured between the free ends of the upper levers 11 and the link is pivotally secured to the lower lever, the printing-surface is held parallel with the bed 81 in all the movements of the frame 10.

The recording and inking portions of the machine are carried by the frame 3 and consist of a strip of paper 83 and an inking-ribbon 84, as shown in Figs. 2, 6, and 7. The paper is mounted on two rollers 85 and 86 at the rear of the frame, and the ribbon is carried by two rollers 87 and 88 in the forward part of the frame. These two sets of rollers are arranged at right angles to each other, so that the ribbon may be carried transversely of the machine above and below the printing mechanism, and the paper is carried longitudinally of the machine, below the lower portion of the ribbon. The ribbon passes over guide-rods 89 adjacent to the rollers 87 and 88 and over rollers 90 on the opposite side of the frame 3. The ribbon is originally wound on the lower roller 87 and is gradually wound onto the upper roller by means of a pawl 91, which engages with a ratchet 92 at the end of the roller. The pawl is seated on a plate 93, which is provided with a notch 94 in one side, into which a lug or projection 95 on the frame 10 fits and by means of which the plate 93 is reciprocated as the frame 10 is moved vertically to make the impressions. A retaining-pawl 96 prevents backward movement of the roller 88 after it has been moved forward by the pawl 91. The paper rollers or spools 85 and 86 are mounted on two pins 97 and are each provided with a hub 98, which is engaged by friction-springs 99, which prevent the movement of the spools and paper except at the proper time. The springs 99 are secured on suitable supports 100, one of which is rigidly secured to the side of the frame 3, and the other one is rotatably mounted on its pin 97. The rotatable support is provided with a ratchet 101, with which a pawl 102 engages to prevent backward movement of the ratchet and support. The ends of the paper are secured to their respective spools by means of clamping-bars 103, which project through slots 104 in the spools and are each provided with a lever 105, the free end of the lever being provided with a projection 106, by means of which the bar can be moved out of its recess in the spool for the insertion or removal of the paper. A spring 107 is connected with the free end of the lever and also with the end of the spool to hold the bar in its recess until after one or more lengths of paper have been wound around the body of the spool, which will bind the bar in position.

The intermediate portion of the paper extends forward and passes around a drum on roller 108 beneath the lower portion of the ribbon, in position to receive the imprint of the mechanism when the frame 10 is moved downward by the rotation of the crank-shaft 49. Two spring-pressed guide-rollers 109 engage with the paper and hold it so firmly in contact with the drum that the paper must move when the drum is registered. The outer end of the shaft of the drum is provided with a thumb-piece 110 and a ratchet 111. A reciprocating bar 112 is mounted in a guideway 113 at its forward end and has its rear end fitting in between the lower support 100 and the side of the frame 3.

The bar is provided with two teeth or projections 114 115, one of which is adapted to engage with the ratchet 101 and the other with the ratchet 111. The forward end of the bar is notched or recessed at 116, and thereby adapted to be engaged by a hook 117 on the rear edge of one of the links 51. Two springs 118 119 engage with the bar over their respective ratchets and prevent the teeth from becoming disengaged from the teeth of the ratchet as the bar is moved forward by the reciprocation of the crank-shaft. A stop 120 projects from one side of the bar in position to engage with the guideway 113 and prevents the bar from being accidentally withdrawn from engagement with the ratchet and frame, and thereby lost when the frame 3 is removed from the casing. A lug 121 on the forward side of a shield 122, partially surrounding the drum 108, engages with a hook or shoulder 123, which rises from the bottom of the casing underneath the frame 10, and thereby holds the frame 3 in its proper position. The top of the frame 3 and the side walls of the two casings terminate at a slight distance below the forward portion of the top plate 7, and thereby leave a narrow slot 124, in which a bill or other paper 125 may be inserted in position to receive an imprint from the printing mechanism.

In using the machine as above described the frame 3 is removed from the casing and the paper strip secured to and wound upon the upper roller and its other end clamped to the lower roller with the intermediate portion passed around the drum in the forward portion of the frame. The ribbon-rollers are provided with a suitable inking-ribbon—as, for instance, one similar to those used with ordinary stamps or by type-writers. The dates in the name-plate are properly set and the frame is then inserted in the casing with the recess 116 of the toothed bar 112 in position to be engaged by the hook on the link 51 when the crank is rotated, as shown in Fig. 5.

The outer or rear wall of the casing is then closed, which will cause two projections 126 thereon to engage with the ends of the spools 85 and 86 and prevent the spools from slipping off the pins 97.

On the receipt of any money in payment of a bill the upper ends of the setting-levers are moved forward until their respective pointers stand adjacent to the characters on the top plate, which indicate said amount. The bill is then inserted in the slit at the top of the case, preferably face downward, and the handle at one side moved forward a half-revolution. As soon as the handle begins to move the rack-bars are locked against movement and the printing-frame is carried down until the characters that correspond with the amount indicated by the pointers are caused to make an imprint on the portion of the paper over the drum through the inking-ribbon. In case the automatic movement for completing the revolution of the crank-shaft fails to operate or is omitted the handle is given another forward movement, which completes the rotation of the crank-shaft, and thereby causes the characters on the upper portion of the recording-wheels, which correspond with those diametrically opposite, and also the remaining portion of the printing-surface to be moved upward and make an imprint on the paper through the upper portion of the inking-ribbon. As the crank-shaft is rotated, as indicated by the dotted circle in Fig. 5, the hook on one of its links engages with the recess of the toothed bar and moves it forward and back. This movement is sufficient to rotate the drum, over which the intermediate portion of the paper is carried a sufficient distance that when the next imprint is made on the paper it will be at the desired distance from the last imprint; but as the spool or roller on which the paper is wound varies in diameter the ratchet which rotates it is only frictionally connected therewith, so as to always take up the amount of paper paid off from the drum, thereby prevent any slack in the paper when the roller is substantially empty or from tearing the paper when the paper-roller is nearly filled.

The first throw of the operating-handle carries the mechanism down and makes a record on the paper, and the second throw carries it up and makes an imprint on the bill in the slot at the top of the casing. The upward movement of the mechanism also operates the ribbon-feed, and the completion of the rotation of the crank-shaft feeds the paper forward and also unlocks the pawls by rotating the cam, so that the lower end of the lever can swing into the recess in the cam, and the locking-plate can swing out from its position over the ends of the pawls.

After the last impression has been made the cam-shaft 48 is given a partial rotation, which withdraws the pawls from the rack-bars and permits all of the setting-levers and printing mechanism to return to their normal or zero position, after which they may be again set for any sum that can be indicated by the characters on the wheels, in the present machine the limit being $999.99. After the collections have been made it is evident that the money brought in by the collector must equal the sum of the different amounts as recorded on the slip of paper. In this manner it is always very easy to have such a check upon the collector as will be infallible, and at the same time each receipted bill must correspond with some one of the amounts recorded on the dates on which said bills were paid. The machine can be made small enough that it is easily portable and provides a record which is indisputable. In case that an error is made in setting the levers to indicate the amount paid, it can be easily corrected by rotating the cam-shaft and returning the levers to their normal position, after which the levers can be correctly set before the crank-shaft is rotated again, thus permitting the collector to prevent the machine from recording the wrong amount against him.

Having described my invention, what I claim is—

1. In a cash-recorder, two casings, one within the other, the inner casing fitting closely within the outer casing and being open at the top, recording mechanism mounted in the inner casing, means for actuating said mechanism and a platen in the outer casing, the outer casing being provided with an opening for introducing a paper between the platen and the recording mechanism.

2. In a cash-recorder, two casings, one within the other, the inner casing fitting closely within the outer casing and open at the top and the rear, the outer casing having a door adapted to close the rear end of both casings, recording mechanism mounted in the inner casing, means for actuating the recording mechanism, removable record-receiving mechanism in the rear end of the casing, and means for inserting a paper through the outer casing in position to receive a record from the recording mechanism.

3. In a cash-recorder, two casings, one within the other, the outer casing being provided with overlapping joints and having one portion of its top overhanging the other portion and provided with a movable end piece, a lock on the end piece, and recording mechanism within the inner casing.

4. In a cash-recorder, a casing, recording mechanism therein, means on the exterior of the casing for changing said mechanism and for making a record therefrom, and means for locking the recording mechanism against change after the record-making means begins to operate.

5. In a cash-recorder, a casing, printing mechanism therein, means for changing said mechanism, means for making two impressions by said mechanism, and means for automatically locking said mechanism against change from the time the impression-making mechanism begins to operate until the second impression has been made.

6. In a cash-recorder, a casing, a series of recording wheels therein, releasable means for automatically locking each wheel against movement, means for making a record from said wheels, and means for automatically locking all of said releasable means against movement from the time the record-making mechanism begins to move until after the record has been made.

7. In a cash-recorder, a casing, a series of recording-wheels therein, record-making mechanism, a pawl for automatically locking each wheel against movement, means for releasing said pawls after said wheels have been set to make a record and before the record-making mechanism has been moved, and means for locking said pawls against movement from the time the record-making mechanism begins to operate until after the record has been made.

8. In a cash-recorder, a casing having a removable rear end, a movable frame provided with a printing-surface and a series of recording-wheels, a portion of said surface being toward said rear end and being removable and variable, means outside of the casing for setting said wheels, and means for making a record.

9. In a cash-recorder, a casing, a movable, slotted frame therein provided with a flat printing-surface and a series of recording-wheels, a portion of said surface being provided with pins for engaging with the slotted portion of the frame, date characters removably mounted in said removable portion of the printing-surface, means outside the casing for setting said wheels, and means for making a record.

10. In a cash-recorder, a casing, a series of recording-wheels movably mounted therein, each provided wth a gear-wheel, reciprocatory bars in the frame, one end of each of which is provided with a rack and the other with a series of notches, pawls for engaging with said notches, one for each bar, a cam for engaging said pawls and simultaneously moving them out of the notches, means on the outside of the casing for setting said wheels, and means for making a record from said wheels.

11. In a cash-recorder, a casing, a movable frame therein, recording-wheels in the frame, reciprocatory bars in the frame, one end of each of which is provided with a slotted arm and the other end is adapted to actuate one of said wheels, levers pivotally mounted in the frame, the free end of which projects through the casing and the intermediate portion of which is provided with a pin for engaging with said arm, means for locking the parts against movement, and means for making a record from said wheels.

12. In a cash-recorder, a casing, a frame pivotally mounted therein, a series of recording-wheels in the frame, reciprocatory bars in the frame in position for actuating said wheels, a locking-pawl for each bar, a locking-plate for all of the pawls, means for disengaging the pawls from the bars, means outside the casing for setting said wheels, and means for making a record from said wheels.

13. In a cash-recorder, a casing, a frame movably mounted therein, a series of recording-wheels in the frame, a reciprocatory, notched bar for actuating each wheel, a substantially L-shaped pawl for engaging with the notches of each bar, a lock for engaging with one end of each pawl and holding it in the notches of the bar, a shaft provided with a cam for engaging with the other end of each pawl, means for rotating said shaft, means for actuating said lock, means on the outside of the casing for setting said wheels, and means for making a record of said wheels.

14. In a cash-recorder, a casing, a frame movably mounted therein, recording-wheels in the frame, reciprocatory, notched bars for actuating the wheels, a substantially L-shaped pawl for engaging with the notches of each bar, a lock for engaging with said pawls, means for actuating said lock when said frame is moved, means for disengaging the pawls from the bars after said movement has been completed, means outside the casing for setting the recording-wheels, and means for making a record from said wheels.

15. In a cash-recorder, a casing, a movable frame therein provided with recording-wheels, a reciprocatory bar for actuating each wheel, a pawl for each bar, a locking-plate for engaging with said pawls, an arm connected with said plate, a lever for moving the arm, a cam for moving the lever as soon as the frame is moved, means for disengaging the pawls from the bars after said movement has been completed, means outside of the casing for setting the recording-wheels, and means for making a record from said wheels.

16. In a cash-recorder, a casing, the top of which is slotted and provided with characters adjacent to each slot, a movable frame in the casing provided with recording-wheels, a reciprocatory bar for each wheel, a lever pivotally secured in the casing at one end for each bar, the opposite end of said lever projecting through one of the slots in the casing and provided with a pointer, means for automatically returning said levers and recording-wheels to their normal position, and means for moving said frame to make a record from said wheels.

17. In a cash-recorder, a casing, the top of which is slotted and provided with characters adjacent to each slot, a movable frame in the casing provided with recording-wheels, reciprocatory bars for actuating said wheels, bent levers pivotally mounted in the frame at one end and projecting through the slots in the casing at the other end and engaging with said bars at the intermediate portions, the pivoted end of each lever being provided with a hub and the free end with a pointer, a coil-spring around each hub in position for automatically returning the free end to its initial position, and means for moving said frame to form a record from said recording-wheels.

18. In a cash-recorder, a slotted casing, the slotted portion of said casing being curved and slotted and provided with characters adjacent to each slot, a movable frame in the casing provided with recording-wheels, reciprocatory bars for actuating said wheels, levers pivotally secured below said curved portion of the casing and having their free ends projecting through said slots and each provided with an indicator, the intermediate portion of said levers being connected with said bars, springs for returning said levers to their initial position, and means for moving said frame to form a record from the recording-wheels.

19. In a cash-recorder, a casing, levers pivotally mounted therein, a frame pivotally secured at the free ends of said levers, recording-wheels mounted in said frame and each provided with duplicate characters, means outside of the casing for setting said wheels, and a double crank-shaft for swinging the levers to make two records from each recording-wheel.

20. In a cash-recorder, a casing, levers pivotally mounted therein, one of said levers being below the others, a frame pivotally mounted between the upper levers, an L-shaped arm rigidly secured at one end to the frame and pivotally secured to the lower lever at the other end, recording-wheels in said frame, each provided with duplicate characters, means outside the casing for setting said wheels and a crank-shaft for swinging said levers to make two records from said wheels.

21. In a cash-recorder, a casing, levers pivotally secured in the casing, a frame at the free end of the levers, recording-wheels in the frame, each provided with duplicate characters, means for setting said wheels, a crank-shaft, links for connecting the crank-shaft with a portion of said levers, means for rotating the crank-shaft to make a record of each wheel at the limit of the movement of said levers and frame in each direction.

22. In a cash-recorder, a casing, levers pivotally mounted therein, a frame at the free ends of said levers, recording-wheels in said frame, each provided with duplicate characters, means for setting said wheels, a crank-shaft, slotted links from said shaft to a portion of said levers, yielding mechanism for holding said frame and levers when the cranks are in intermediate positions in said slots, and means for rotating said shaft to make two records from each of said wheels.

23. In a cash-recorder, a casing, levers pivotally mounted therein, a frame pivotally mounted at the free ends of said levers, recording-wheels in the frame, each provided with duplicate characters, means for setting said registers, a rod through a portion of said levers, a crank-shaft, slotted links from said shaft to said rod, an arm on said rod, two supports for the free end of said arm, and a spring engaging with said arm between said supports, and means for rotating the crank-shaft to make two records from each wheel.

24. In a cash-recorder, a casing, levers pivotally mounted therein, a frame pivotally secured to the free ends thereof, recording-wheels in the frame, each provided with duplicate characters, means for setting said wheels, a crank-shaft, links for connecting the shaft with a portion of said levers, and oscillatory means outside the casing for rotating said shaft.

25. In a cash-recorder, a casing, levers pivotally mounted therein, a frame pivotally secured to the free ends thereof, recording-wheels in the frame, each provided with duplicate characters, means for setting said wheels, a crank-shaft, links for connecting the shaft with a portion of said levers, a shaft through the casing, the outer end of which is provided with a handle and the inner end with means for rotating the crank-shaft.

26. In a cash-recorder, a casing, levers pivotally mounted therein, a frame pivotally secured to the free ends thereof, recording-wheels in the frame, each provided with duplicate characters, means for setting said wheels, a crank-shaft, links connecting the shaft with a portion of said levers, a shaft through the casing, the outer end of which is provided with a handle and the inner end with means for rotating the crank-shaft, a stop in the casing for limiting the movement of the handle in one direction, and a spring on the shaft for returning it to cause the handle to rest against said stop.

27. In a cash-recorder, a casing, levers pivotally mounted therein, a frame pivotally secured at the free ends of said levers, recording-wheels in the frame, each provided with duplicate characters, means for setting said wheels, a crank-shaft in the frame, one end of which is provided with a ratchet-wheel, links from the shaft to a portion of said levers, a shaft through the casing, the outer end of which is provided with a handle and the inner end with an arm, and a pawl on said arm for engaging with said ratchet-wheel at two points only.

28. In a cash-recorder, a casing, recording mechanism movably mounted therein, a crank-shaft for moving said mechanism, one end of which is provided with a crank, a handle for rotating said shaft part of a revolution, and a link connected with said crank and a spring connected with the free end of said link for moving the link endwise for completing said revolution.

29. In a cash-recorder, a casing, recording mechanism movably mounted therein, a removable frame in the casing, two paper-carrying rollers and a drum mounted in the frame, means for positively rotating the drum and one of said rollers, and means for making from the recording mechanism a record on the paper carried by said rollers and drum.

30. In a cash-recorder, a casing, recording mechanism movably mounted therein, a removable frame in the casing, two paper-carrying rollers and a drum in said frame, a ratchet-wheel at the end of the drum and one of the rollers respectively, a reciprocating toothed bar engaging with said ratchets, means for actuating the recording mechanism to make a record on the paper carried by the drum and rollers, and means for reciprocating the toothed bar.

31. In a cash-recorder, a casing, recording mechanism movably mounted therein, a removable frame in the casing, two rollers and a drum in the frame, a ratchet on the drum and on one of said rollers, a toothed bar engaging said ratchets, a stop on bar, springs engaging with said bar, means for reciprocating the toothed bar and means for moving the recording mechanism to make a record on the paper carried by said drum and rollers.

32. In a cash-recorder a casing, recording mechanism movably mounted therein, a removable frame in the casing, two rollers and a drum in the frame adapted to carry a strip of paper, means for simultaneously moving the drum and one of said rollers, and friction mechanism for controlling the movements of the rollers.

33. In a cash-recorder a casing, recording mechanism movably mounted in the casing, a movable frame, two paper-carrying rollers and a drum in the frame, a hub on the drum, a friction-spring in the hub, means for simultaneously rotating the drum and one of the rollers, and means for moving the recording mechanism to make a record on the paper.

34. In a cash-recorder, a casing, recording mechanism movably mounted therein, a removable frame in the casing, a drum in the frame, two pins projecting from one side of the frame, two supports at the bases of said pins, one of which is rigid and the other is rotatable on its pin, a spool mounted on each pin, each spool being provided with a hub, friction-springs of the supports in engagement with said hubs, a ratchet-wheel on the loosely-mounted support, a ratchet-wheel on the drum-axle, a reciprocatory toothed bar for engaging said ratchets, and means for moving the registering mechanism to make a record on said paper and to reciprocate said bar.

35. In a cash-recorder, a casing, one end of which is movable, recording mechanism movably mounted in the casing, a removable frame in the casing adjacent to said movable portion, a drum in the frame, pins projecting from one side of the casing, spools rotatably mounted on said pins, means on the movable portion of the casing for engaging with the ends of said spools and holding them on the pins while the casing is closed, and means for moving the recording mechanism to make a record and to rotate said drum and one of the spools.

36. In a cash-recorder, a casing, recording mechanism movably mounted therein provided with a hook, a crank-shaft for moving the recording mechanism and said hook, a removable frame in the casing, a drum and two rollers in the frame, a reciprocatory bar for rotating the drum and one of said rollers, the forward end of said bar being recessed and adapted to be engaged by said hook.

37. In a cash-recorder, a casing, recording mechanism movably mounted thereon, a removable frame in the casing, two sets of rollers in the frame, the rollers of one set being adapted to carry a strip of paper, and the rollers of the other set an inking-ribbon, means for passing the inking-ribbon above and below the recording mechanism, and means for moving the recording mechanism to make two records.

38. In a cash-recorder a casing, recording mechanism movably mounted therein, a removable frame in the casing, paper-carrying and inking-ribbon, controlling devices in the said frame adapted to guide the paper in one direction longitudinally of the frame and the inking-ribbon transversely thereof, means for passing the inking-ribbon above and below the recording mechanism, means for moving the recording mechanism to make two records on the paper, and means connected with the recording mechanism for intermittently moving the paper and the ribbon.

39. In a cash-recorder a casing, recording mechanism movably mounted therein, a removable frame in the casing, two sets of rollers in the said frame, the rollers of one set being arranged longitudinally at one side of the frame, guide-rollers journaled on the other side of the frame, a drum at the bottom of the casing, one set of the rollers and said drum being adapted to carry a strip of paper to receive the record and the other rollers and said guide-rollers adapted to carry and guide an inking-ribbon over the drum and the record-receiving paper, and means for moving the recording mechanism between the upper and lower portions of the guided inking-ribbon to make two records.

40. In a cash-recorder a casing, recording mechanism movably mounted therein, a removable frame in the casing, two sets of rollers in the frame, ratchet mechanism on one roller of each set, a notched plate carrying the pawl of one of said ratchet mechanisms, a projection on the recording mechanism for engaging the said plate, the rollers of one set being adapted to carry a recording-receiving paper, an inking-ribbon on the rollers of the other set, means for moving the record mechanism to make two records, and means for actuating the record mechanism.

41. In a cash-recorder, a casing, the top of which is provided with a narrow slot, recording mechanism movably mounted in the casing, a removable frame in the casing the top of which terminates below said slot, means for holding said frame against movement toward the top of the casing, an inking-ribbon above and below the recording mechanism and means for moving the recording mechanism against said ribbon to make two records.

42. In a cash-recorder, a casing, the top of which is provided with a narrow slot, recording mechanism movably mounted in the casing, a hook on the bottom of the casing, a removable frame in the casing provided with means for engaging with said hook and terminating below said slot, an inking-ribbon above and below the recording mechanism and means for moving the recording mechanism into engagement with the inking-ribbon to make two records.

43. In a cash-recorder, a casing, the top of which is provided with a narrow slot, a yielding pad in said top, recording mechanism movably mounted in the casing, a hook on the bottom of the casing, a removable frame in the casing, a drum mounted in the frame, a shield adjacent to the drum provided with a projection engaging with said hook, the top of the frame terminating below said slot, an inking-ribbon above and below the recording mechanism, and means for moving the recording mechanism to engage with said ribbon and make two records.

In testimony whereof I have hereunto set my name to this specification in the presence of two subscribing witnesses.

FREDERICK H. SMITH.

Witnesses:
EDWARD E. OSBORN,
M. REGNER.